United States Patent [19]

Lorenzini

[11] 4,219,937
[45] Sep. 2, 1980

[54] GAUGE FOR MEASURING INTERNAL DIAMETERS

[76] Inventor: Robert A. Lorenzini, Box 91, Hancock, Mass. 01237

[21] Appl. No.: 71,589

[22] Filed: Aug. 31, 1979

[51] Int. Cl.³ .......................... G01B 5/12; G01B 5/18
[52] U.S. Cl. ................................. 33/178 B; 33/169 B
[58] Field of Search ............ 33/168 R, 169 B, 169 R, 33/178 R, 178 B

[56] References Cited

U.S. PATENT DOCUMENTS

| 750,449 | 1/1904 | Gillard | 33/169 B |
|---|---|---|---|
| 1,210,963 | 1/1917 | Mascher | 33/178 B |
| 2,190,899 | 2/1940 | Vierling | 33/169 B |

FOREIGN PATENT DOCUMENTS 1164703 9/1969 United Kingdom ................. 33/178 R

*Primary Examiner*—Harry N. Haroian
*Attorney, Agent, or Firm*—Richard A. Menelly; Francis X. Doyle

[57] ABSTRACT

This invention relates to a gauge for measuring the internal diameter of a passage. The gauge comprises a tapered calibrated cone with an extendable rod member. The tapered cone is inserted within the passage and the rod is extended to contact the edge of interior surface of the passage adjacent the diameter to be determined.

13 Claims, 6 Drawing Figures

U.S. Patent Sep. 2, 1980 Sheet 1 of 2 4,219,937
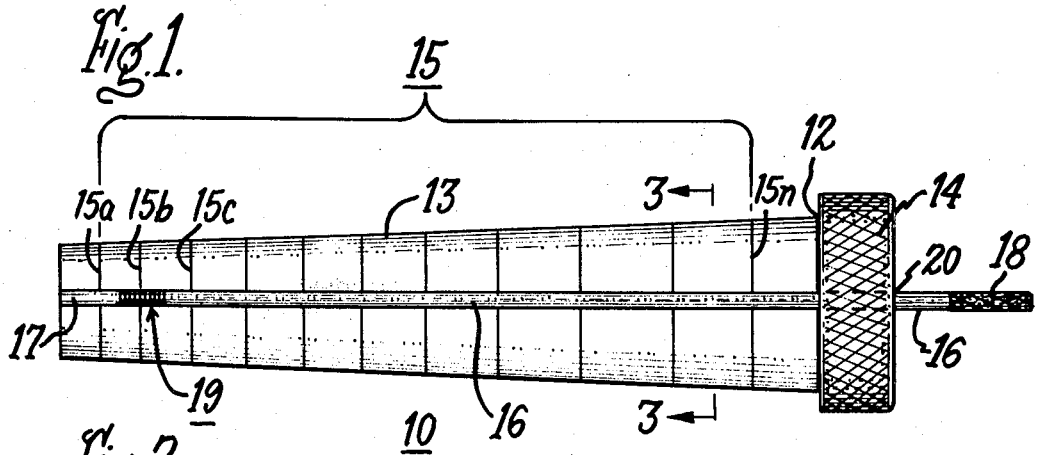
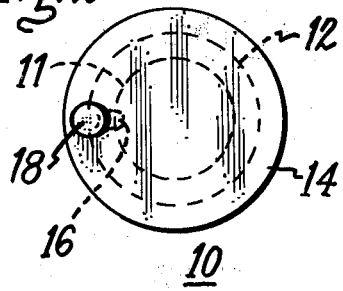
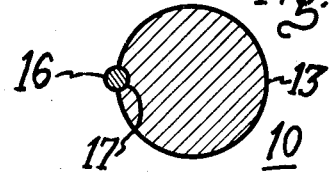
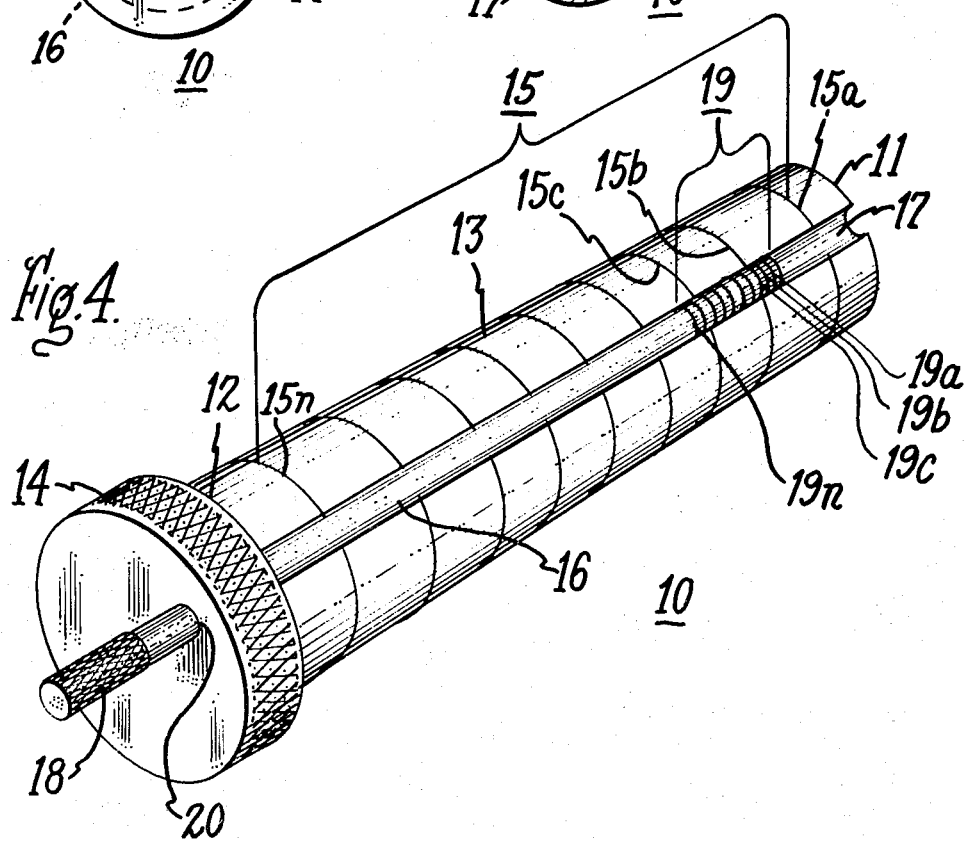

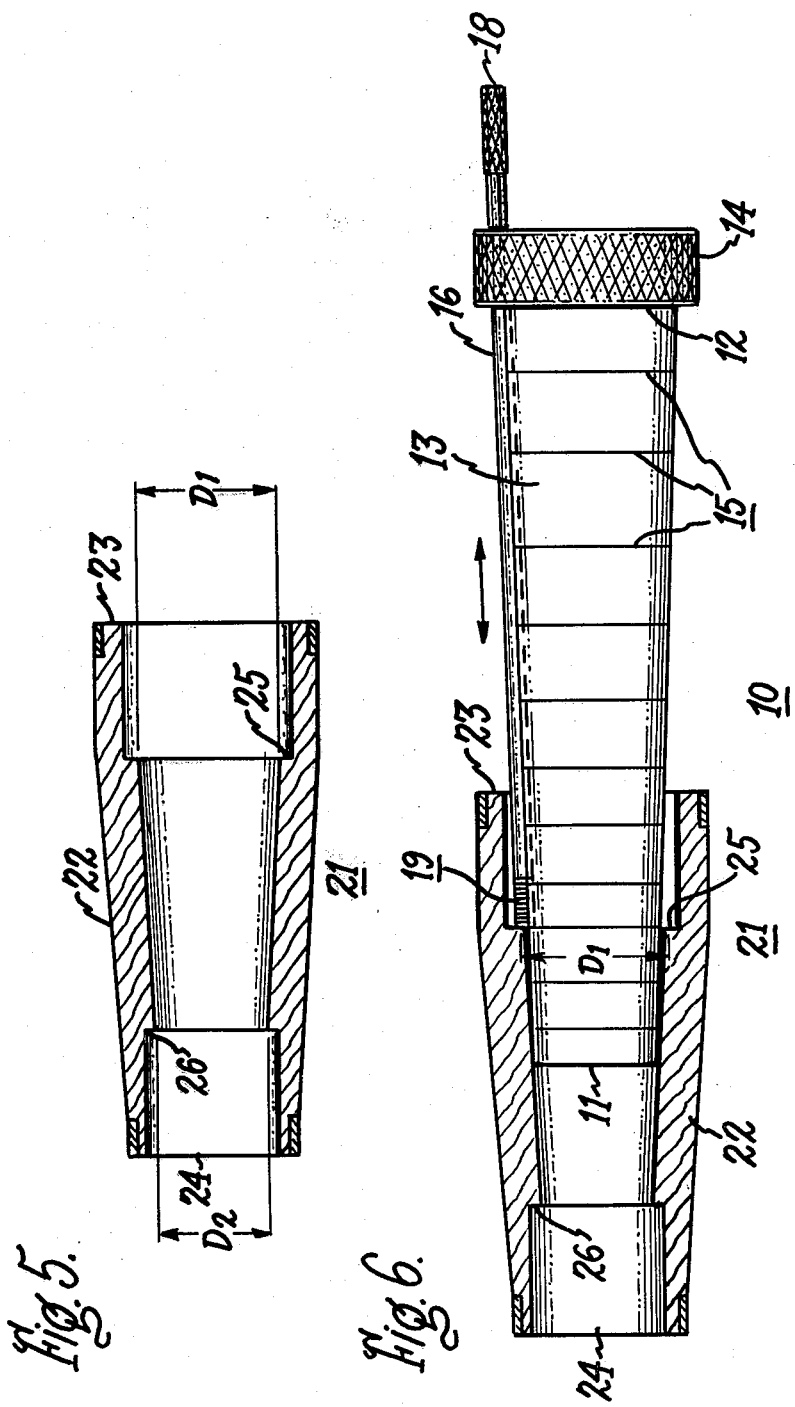

GAUGE FOR MEASURING INTERNAL DIAMETERS

BACKGROUND OF THE INVENTION

One of the problems to be overcome by the instant invention is the uncertainty in determining the diameter of a passage which is recessed within a larger opening. This is particularly true, for example, when the internal passage is tapered and when very exact information must be obtained relative to the diameter at the instant of taper.

U.S. patent application Ser. No. 71,590 describes a clarinet barrel having a plurality of removable throat members. One of the problems involved in fabricating the removable throats for the barrel is the uncertainty in obtaining the exact internal bore diameter of the throat at a prescribed distant within the barrel. This is accomplished by means of the instant invention by inserting the conically tapered portion of the gauge within the clarinet throat and extending the rod portion of the gauge until contact is made with an interior step portion of the throat. The gauge can also be used to measure the diameter of other parts of the clarinet including the mouthpiece.

SUMMARY OF THE INVENTION

A calibrated conical gauge employing an extendable rod within a linear groove on the surface of the cone is inserted within the interior of a passage to be measured and the rod is extended until contact is made with the interior surface at a prescribed distance opposite the diameter of the passage to be determined. Removing the gauge with the extended member intact provides an exact measurement of the interior diameter at the prescribed distance along the passage.

BRIEF DESCRIPTION OF THE DRAWING

FIG. 1 is a plan view of the gauge of the invention;
FIG. 2 is an end view of the gauge of FIG. 1;
FIG. 3 is a cross section of the gauge of FIG. 1 along the 3—3 plane;
FIG. 4 is a top perspective view of the gauge of FIG. 1;
FIG. 5 is a side-sectional view of a clarinet barrel; and
FIG. 6 is a side-sectional view of the clarinet barrel of FIG. 5 with the gauge of the invention in side view perspective inserted therein.

DESCRIPTION OF THE PREFERRED EMBODIMENT

FIG. 1 shows gauge 10 according to the invention having a first end 11 and a second end 12 with an intervening tapered barrel portion 13. A knurled raised end portion 14 is provided on the second end for ease in inserting and holding the gauge. Barrel portion 13 contains a plurality of gradations 15a–15n which correspond in increasing increments to the size of the barrel diameter at each gradation. An extendable rod 16 is slidably mounted on a portion of barrel 13 by means of a groove 17 and contains a knurled end portion 18 for ease in positioning the rod. A plurality of gradations 19a–19n are indicated at one end of the rod and each gradation corresponds to a fraction of the increment in diameter between any pair of the individual barrel gradations 15a–15n. The rod is inserted within hole 20 formed in the knurled raised portion 14 and fits concentrically within groove 17. By carefully selecting the diameter of hole 20 and the radius of groove 17, rod 16 will remain in position within the groove until the rod is mechanically moved to a new position. The conical shape of the gauge and the gradation from the first to the second end can be adjusted to accommodate any type of internal diameter measurement. Gauge 10, viewed from the end in FIG. 2, shows knurled end portion 18 of rod 16 extending outward from knurled portion 14 of barrel 13, with the first and second barrel ends, 11, 12, indicated in dotted lines.

The close-fit relationship between rod 16 and groove 17 can be seen in the cross-section of gauge 10 depicted in FIG. 3 representing a section through the barrel portion of FIG. 1 through the plane 3—3.

The method of using the inventive gauge can be seen by referring to FIG. 4 wherein the gauge is shown with first end 11 positioned away from an operator and with second end 12 proximate the operator so that the operator can hold and retain knurled portion 14 of barrel 13 with one hand and knurled end 18 of rod 16 with his other hand. Manipulation of the gauge consists of two functions; namely moving the gauge until barrel portion 13 contacts the interior surface of the passage to be measured and extending rod 16 by means knurled end 18 until the end of rod 16 contacts the wall portion adjacent the passage diameter being measured. Gradations 15a–15n can be in any unit desired but, for purposes of this disclosure, are in increments of five thousandths of an inch. When the diameter of first end 11 is one-half inch, for example, the gradations increase corresponding to the increase in diameter of barrel 13 up to second end 12. With rod 16 in the position on barrel 13 shown in FIG. 4, the diameter is calculated as follows. The second increment 15b from first end 11, comprises 0.510 inches in diameter. The number of gradations 19 on rod 16 extending past second increment 15b are then determined. In the configuration shown in FIG. 4, rod 16 extends four gradations beyond second gradation 15b on barrel 13. The number of gradations on the rod are then subtracted from the diameter 0.510 indicated on second increment 15b. Subtracting the four-one thousandths increments on rod 16 (0.004) from the 0.510 inch calculation results in an exact diameter measurement of 0.506 inches.

Barrel portion 13 and knurled portion 14 are made of a light durable metal such as aluminum, copper, or their alloys. However, it is also within the scope of this invention to fabricate the entire gauge consisting of barrel portion 13, knurled portion 14, and rod 16, out of a durable plastic material such as a thermoplastic carbonate-linked polymer such as a polycarbonate or from a polyamide polymer such as nylon.

A practical application for the gauge of the instant invention can be seen by referring to the aforementioned U.S. patent application wherein a removable throat is disclosed for use within a clarinet barrel. FIG. 5 shows a removable throat 21 of the type consisting of a tapered body 22 extending from front end 23 to back end 24 wherein the diameter $D_1$ on the interior surface of throat 21, proximate front step portion 25, is larger than the diameter $D_2$ proximate the back step portion 26. Since diameter $D_1$ is recessed within front end 23 of throat 21, this dimension is extremely difficult to obtain by standard internal calibration techniques.

FIG. 6 shows throat 21 of FIG. 5 with gauge 10 being inserted within front end 23 until barrel 13 snugly contacts the interior surface of throat body 22 at the region of front diameter $D_1$. Rod 16 is then slowly moved forward by gently extending knurled end 18 until the opposite end of rod 16 contact front step 25 of throat 21. Gauge 10 is then removed and the number of gradations 15 from end 11 to the end of rod 16 are determined. In the embodiment depicted in FIG. 6, three gradations 15 are counted from end 11 to the end of rod 16 and the number of gradations 19 on rod 16 extending between a pair of barrel gradations are zero. The dimension of front end diameter $D_1$, therefore, measures 0.515 inches since each barrel increment 15 corresponds to five throusandths of an inch. In order to determine diameter $D_2$ of back end 24, gauge 10 is inserted within back end 24 and rod 16 is extended until contact is made with back step portion 26.

Although the internal diameter gauge of this invention is disclosed for use in determining the dimensions of clarinet bores, this is by way of example only. The internal diameter gauge of this invention finds application wherever internal diameters may have to be accurately determined.

I claim:

1. A gauge for measuring internal diameters comprising: a tapered cylindrical body portion for inserting within a passageway for contacting a wall portion of said passageway;
   a rod member moveably mounted on a surface of the cylindrical body for extending along said body and contacting a portion of said passage wall;
   a groove extending along said body for guiding said rod member;
   a raised portion on one end of said body to provide holding facility to said body; and
   a passageway extending through said raised portion for providing further guide means to said rod.

2. The gauge of claim 1 further including a plurality of gradations on the surface of said cylindrical body wherein each gradation corresponds to a diameter of said body.

3. The gauge of claim 2 wherein said gradations are separated from each other by a plurality of distance increments.

4. The gauge of claim 1 wherein said body portion has a first diameter at one end and a second diameter at an opposite end, said second diameter being larger than said first diameter.

5. The gauge of claim 4 wherein the first diameter is one-half inch and the second diameter is one inch.

6. The gauge of claim 1 wherein said rod further includes holding means at one end.

7. The gauge of claim 1 wherein the rod includes a plurality of dimensional gradations at one end.

8. The gauge of claim 1 wherein the body is made from a metal.

9. The gauge of claim 1 wherein the body portion is made from plastic.

10. The gauge of claim 1 wherein the rod member is made from a metal.

11. The gauge of claim 1 wherein the rod member is made from plastic.

12. The gauge of claim 1 wherein the body portion is made from wood.

13. The gauge of claim 1 wherein the rod member is made from wood.

* * * * *